United States Patent
Autio et al.

(10) Patent No.: US 10,084,899 B2
(45) Date of Patent: *Sep. 25, 2018

(54) METHOD FOR ENABLING A COMMUNICATION VIA A MOBILE PHONE AND MOBILE PHONE ENABLING A COMMUNICATION

(75) Inventors: Markku Autio, Oulu (FI); Esa Nettamo, Oulu (FI)

(73) Assignee: HMD GLOBAL OY, Espoo (FI)

( * ) Notice: Subject to any disclaimer, the term of this patent is extended or adjusted under 35 U.S.C. 154(b) by 0 days.

This patent is subject to a terminal disclaimer.

(21) Appl. No.: 12/728,677

(22) Filed: Mar. 22, 2010

(65) Prior Publication Data

US 2010/0234078 A1    Sep. 16, 2010

Related U.S. Application Data

(63) Continuation of application No. 10/505,085, filed as application No. PCT/IB03/00107 on Jan. 17, 2003, now Pat. No. 7,684,827.

(30) Foreign Application Priority Data

Feb. 19, 2002    (EP) .................................... 02003202

(51) Int. Cl.
*H04W 88/02*    (2009.01)
*H04M 1/2745*    (2006.01)
*H04M 1/725*    (2006.01)

(52) U.S. Cl.
CPC ... *H04M 1/27455* (2013.01); *H04M 1/72522* (2013.01); *H04M 1/72547* (2013.01); *H04M 1/72561* (2013.01)

(58) Field of Classification Search
CPC ......... H04M 1/27455; H04M 1/72522; H04M 1/72561; H04M 1/72547

(Continued)

(56) References Cited

U.S. PATENT DOCUMENTS 5,644,628 A    7/1997    Schwarzer et al.
5,946,647 A    8/1999    Miller et al.
(Continued)

FOREIGN PATENT DOCUMENTS

EP    0 458 563 A2    11/1991
EP    0 946 028 A2    9/1999
(Continued)

OTHER PUBLICATIONS

The Kyocera Smartphone User's Guide (Kyocera, Dec. 31, 2001, Cover page, p. iii, pp. 94-96).*

(Continued)

*Primary Examiner* — Erica Navar
(74) *Attorney, Agent, or Firm* — Alston & Bird LLP

(57) ABSTRACT

The invention relates to a method for enabling a communication via a mobile phone. In order to enable a comfortable creation of communications during a context of a mobile phone provided by a conventionally static application, it is proposed that the method comprises as a first step displaying information available for a specific content on a display of the mobile phone. In a next step, it is detected whether a user selected a displayed information. In case an information is selected, the kind of the selected information is determined. Then, functions associated to the kind of the selected information are presented on the display. To at least one kind of possible information the establishment of at least one kind of communication is associated as at least one function. Finally, a function selected by a user is activated. The invention relates equally to a corresponding mobile phone.

18 Claims, 3 Drawing Sheets

(58) Field of Classification Search
USPC .............. 455/566, 550.1, 564, 556.2, 418, 455/414.1–414.2; 715/744–747, 760, 715/765, 788, 810, 841, 857, 975; 345/51, 173, 2.3, 169; 379/88.11, 122, 379/93.17, 136, 142.17, 93.23, 428.03
See application file for complete search history.

(56) References Cited

U.S. PATENT DOCUMENTS

| | | | |
|---|---|---|---|
| 6,178,338 B1 | 1/2001 | Yamagishi et al. | |
| 6,262,735 B1 | 7/2001 | Etelapera | |
| 6,309,305 B1 | 10/2001 | Kraft | |
| 6,349,299 B1 * | 2/2002 | Spencer | G06F 17/30569 707/702 |
| 6,430,405 B1 * | 8/2002 | Jambhekar et al. | 455/403 |
| 6,570,596 B2 * | 5/2003 | Frederiksen | 715/808 |
| 6,671,508 B1 | 12/2003 | Mitsouka et al. | |
| 6,674,453 B1 * | 1/2004 | Schilit | G06F 17/30893 707/E17.117 |
| 6,781,575 B1 | 8/2004 | Hawkins et al. | |
| 7,684,827 B2 * | 3/2010 | Autio et al. | 455/566 |
| 2002/0072395 A1 | 6/2002 | Miramontes | |
| 2002/0115476 A1 | 8/2002 | Padawer et al. | |
| 2003/0013483 A1 | 1/2003 | Ausems et al. | |
| 2003/0022701 A1 * | 1/2003 | Gupta | 455/566 |
| 2003/0117365 A1 * | 6/2003 | Shteyn | 345/156 |
| 2007/0101366 A1 * | 5/2007 | Won | H04M 1/72552 725/39 |

FOREIGN PATENT DOCUMENTS

| | | | |
|---|---|---|---|
| EP | 1 033 878 A2 | 9/2000 | |
| EP | 1033878 A2 * | 9/2000 | .............. H04N 7/14 |
| GB | 2 355 142 A | 4/2001 | |
| GB | 2 355 154 A | 4/2001 | |
| WO | WO 99/37075 | 7/1999 | |
| WO | WO 01/50712 | 7/2001 | |

OTHER PUBLICATIONS

Call PC to phone, PC to Pc, phone to phone; pp. 1-6; http://svetart.tripod.com; Oct. 20, 2004.

Office Action issued by the Patent Office of the People's Republic of China on Dec. 9, 2008 in connection with a corresponding Chinese patent application.

European Search Report from EP Application No. 02 00 3202, dated Jun. 3, 2002.

International Search Report from International Application No. PCT/IB03/00107, dated Mar. 20, 2003.

International Preliminary Report on Patentability from International Application No. PCT/IB03/00107, dated Jun. 4, 2004.

Admin (https://www.geek.com/author/admin/), "Send SMS messages via the Web—Geek.com", Jul. 20, 2000, 36 pages, retrieved from <https://www.geek.com/mobile/send-sms-messages-via-the-web-565457/> on Dec. 18, 2017.

* cited by examiner

METHOD FOR ENABLING A COMMUNICATION VIA A MOBILE PHONE AND MOBILE PHONE ENABLING A COMMUNICATION

CROSS REFERENCE TO RELATED APPLICATIONS

This application is a continuation of U.S. application Ser. No. 10/505,085, filed Aug. 18, 2004, now U.S. Pat. No. 7,684,827 which is a National Phase of PCT/IB2003/00107, filed Jan. 17, 2003, which claims priority to European Application No. 02003202.5, filed Feb. 19, 2002, the contents of all which are incorporated herein by reference.

TECHNOLOGICAL FIELD

The invention relates to a method for enabling a communication via a mobile phone. The invention relates equally to a mobile phone enabling a communication, which mobile phone comprises a display and processing means.

BACKGROUND

Mobile phones, like personal digital assistant (PDA) phones, are well known from the state of the art.

Such mobile phones usually comprise processing means providing a variety of functions and a display for presenting pieces of information to a user in accordance with a current context.

A mobile phone can be used in particular for communication purposes. In order to enable a communication, conventional mobile phones usually comprise an application managing a phonebook, which application is run by the processing means of the phone.

When the user opens the phonebook, a list of stored phone numbers are presented on the display. The user can then select one of these numbers by means of a number parser.

Alternatively, the user can input a desired phone number manually. The selected or the input number is used for establishing a desired connection, e.g. for a phone call, for sending an SMS (short message service) message or for transmitting a facsimile.

Mobile phones moreover often comprise static applications presenting some content on a display of the mobile phone, which content is not restricted to comprise a specific kind of information, e.g. a calendar, a browser or a messaging application. In some cases, a presented content will comprise a contact information based on which a connection could be established. Such a contact information can be for instance a phone number that might be used for establishing a phone call.

Known applications of this kind, however, do not comprise any immediate communication features themselves. They lack in particular call creation possibilities. For example, in case a user wants to establish a call to a phone number presented in a calendar, the user has first to enter the number again, or, in case the number is stored in the phonebook, to open a phonebook and select the number, before a connection can be established. This is obviously rather annoying for a user, since the desired phone number was already displayed. A direct manipulation method, which comprises tapping the number, further results in a high error rate. The same applies to other connection related information, e.g. email addresses or fax-numbers.

SUMMARY

It is an object of the invention to enable a comfortable creation of communications during a context of a mobile phone induced by a conventionally static application.

This object is reached according to the invention on the one hand by a method for enabling a communication via a mobile phone. It is proposed that the method comprises as a first step displaying information available for a specific content on a display of said mobile phone. In a second step, it is detected whether a user selected a displayed information. In case an information is selected, the kind of the selected information is determined. Next, functions of the mobile phone associated to the selected kind of information, if any, are offered on the display to the user. To at least one kind of possible information the establishment of at least one kind of communication is associated as at least one function. Finally, if one of the offered functions is selected by a user, this function is activated.

On the other hand, the object of the invention is reached by a mobile phone comprising a display and processing means for realizing the steps of the proposed method.

The invention proceeds from the idea that also conventionally static applications could be adapted in a way that they provide a direct user interface for a communication. To this end, it is ensured that information presented on the display of a mobile phone can be selected by a user. The selectable information may be restricted, e.g., to alphanumeric information. At least one kind of information that can be selected should identify a specific connection.

In conventional applications provided explicitly for the establishment of a connection, the kind of information that can be selected in a specific context is always definite. The invention, in contrast, allows a user to select more than one kind of information presented for a specific content. Therefore, it is further provided that the kind of an information that has been selected is determined. There may be only a single kind of information to which a function is associated, e.g., to phone numbers. But even in this case, the step of determining the kind of selected information is required for detecting whether a selected information is of this one kind or of another kind. To each kind of information, a variety of functions might be associated, of which at least one function consists in the establishment of a communication. All functions associated to a determined kind of information are offered to a user of the phone, who can then call a desired function by selecting it.

It is thus an advantage of the invention that it facilitates calling a communication related function. It is in particular an advantage that such a function is associated to a presented information and can be called directly from an application which is realized conventionally in a static manner. The provided user interface enables thereby an easy and intuitive establishment of a communication.

It is moreover an advantage of the invention that it constitutes a revalorization of already existing applications.

The operating system Microsoft Windows# offers for PCs (personal computer) an opportunity to get a menu to a displayed text by clicking the right mouse button. The appearing menu functions can then be selected to be applied to the currently selected text. Even though this constitutes a similar approach as the approach of the invention, it is not known to be transferable to connections created via mobile phones.

Preferred embodiments of the application become apparent from the dependent claims.

The content can be provided by any application which enables the presentation of information that identifies a specific connection. The application can be in particular a calendar, a browser and/or a messaging application.

The information to which at least one function is associated can be in particular alphanumeric information, like a phone number, a fax number or an email-address.

But it is also possible to assign functions to other information, e.g., to an image of a person presented in a calendar, to which person a phone number is associated, even though the phone number itself is not necessarily displayed.

Possible functions which establish a communication and which are associated to a phone number are for example a call setup and a transmission of an SMS. Additionally offered functions that are not related to the establishment of a connection are not restricted in any way. There may be e.g., the option to store a selected number in a phonebook etc.

In a preferred embodiment of the invention, the selectable functions associated to a selected kind of information are presented by the processing means as graphical icons, even though a presentation as displayed text is possible as well. In a conventional application, a user might establish a call by accident, when he/she only intends to copy a number from the screen. Using graphical icons popping up on the display in order to provide a possibility to establish a connection, in contrast, does not interfere with the normal usage of a presented content.

The method according to the invention can be realized in particular as a new software component on the operating system level of a mobile phone.

BRIEF DESCRIPTION OF THE FIGURES

Other objects and features of the present invention will become apparent from the following detailed description of an exemplary embodiment of the invention considered in conjunction with the accompanying drawings, of which.

DETAILED DESCRIPTION

Figure 4:
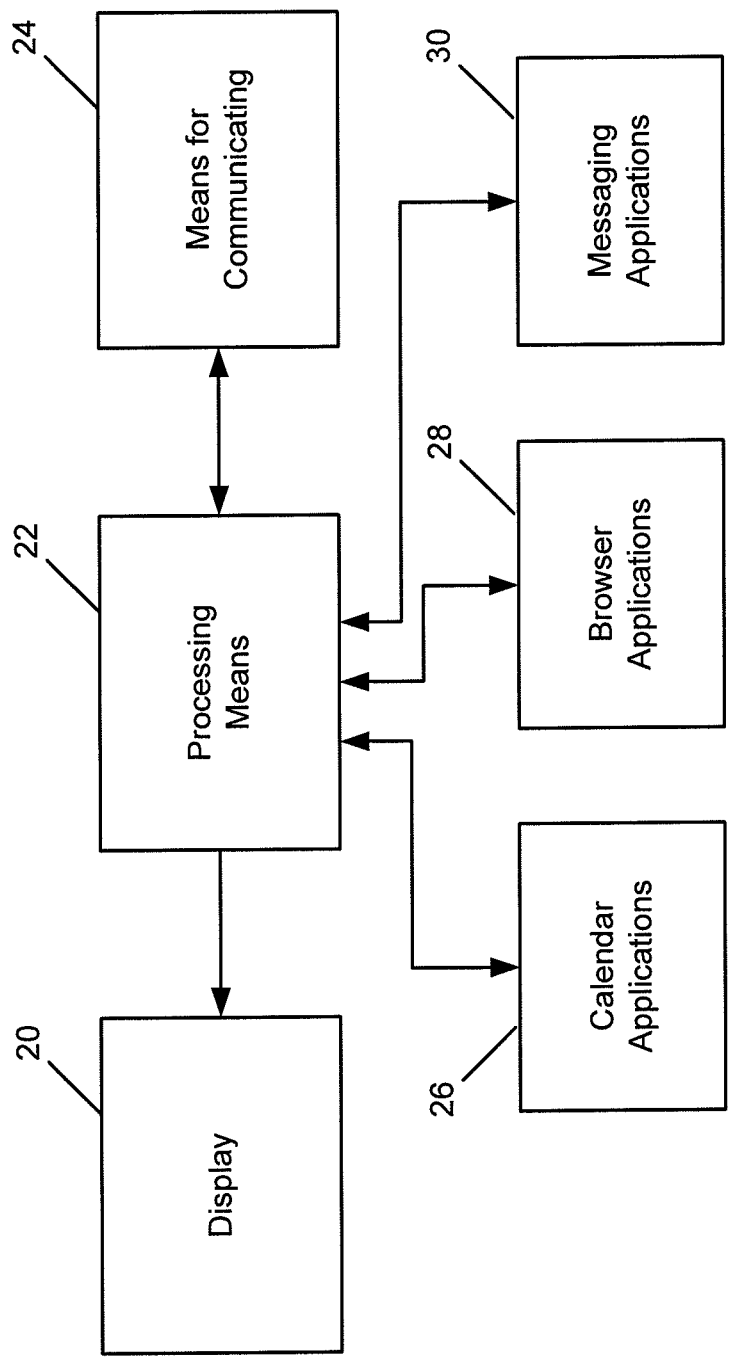
FIG. 4 is a block diagram of an apparatus according to one embodiment of the invention.

The invention is described by way of example for a PDA phone, which comprises a display 20, processing means 22, and means 24 for communicating with other terminals or with a server via a mobile communication network, as shown in FIG. 4. The processing means are suited to run different applications, such as a calendar application 26, a browser application 28 or a messaging application 30, and to present a corresponding content on the display of the phone. The processing means further run an operating system to which a new software component was added for realizing the features of the invention.

The PDA phone provides on the one hand conventional ways of establishing a connection with another terminal. On the other hand, it enables the establishment of a connection in accordance with the invention.

Figure 1:
FIG. 1 is a first view on a display of a mobile phone according to the invention.
Figure 2:
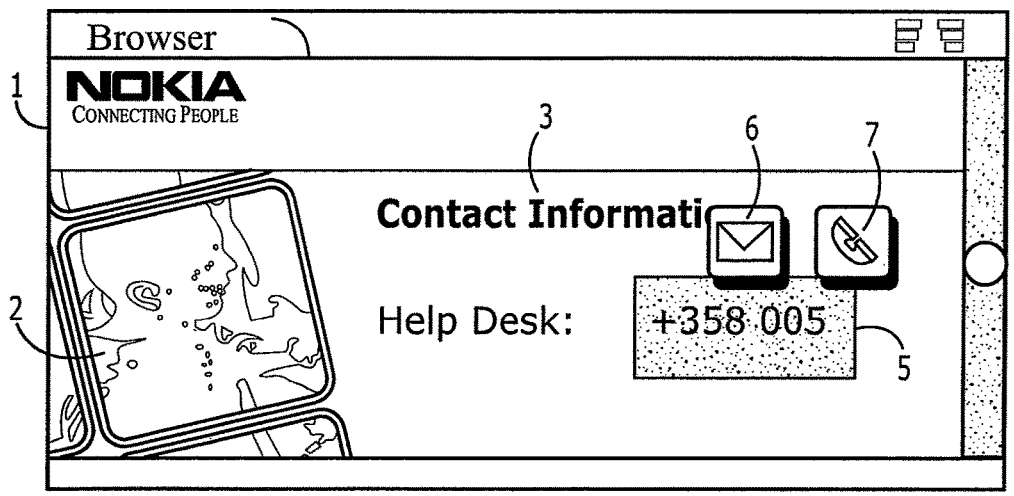
FIG. 2 is a second view on a display of a mobile phone according to the invention.
Figure 3:
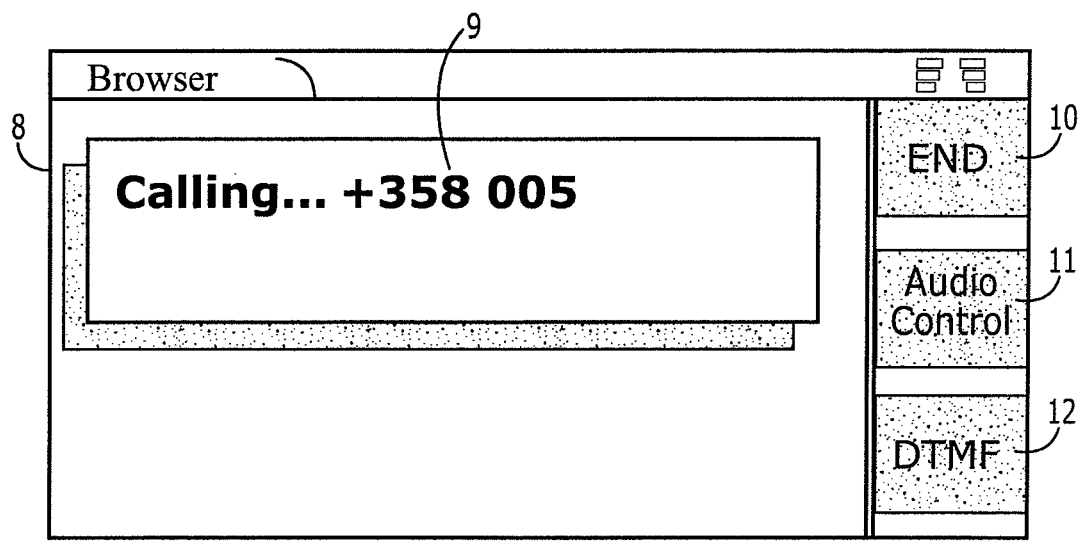
FIG. 3 is a third view on a display of a mobile phone according to the invention.

The latter possibility is illustrated by FIGS. 1 to 3, which present a view on the display of the PDA phone in different stages. These stages will now be described.

A user of the phone starts a browser, which is displayed on the display by a corresponding application run by the processing means. The user further opens the contact information page of a company in the browser.

FIG. 1 presents the browser showing this contact information page 1. The contact information page 1 comprises graphical images 2, e.g. an image of a contact person. The contact information page 1 further comprises the indication, Contact Information" 3 as well as the phone number of a help desk 4.

The user is enabled by the operating system to select any presented alphanumeric information. In case the user now desires to contact the help desk of the company, he/she highlights the presented phone number 4 with a stylus.

This selection is indicated in FIG. 2, which shows the same contact page 1 in the called browser as FIG. 1, by a presentation of the phone number 5 and its immediate background with inverted colors.

The new component of the operating system registers the selection of a presented alphanumeric information 5 and tries to determine the kind of the selected information.

In the presented case, the operating system is able to interpret the selection as a phone number by a number parser.

The new component of the operating system now determines all functions associated to phone numbers. The association of functions to different kinds of information is predetermined in the operating system. In the presented embodiment, the functions associated to phone numbers are sending an SMS and establishing a call.

Both determined functions are offered to the user by graphical icons. The SMS function is represented more specifically by an envelop 6 and the call establishment function by a telephone receiver 7. These graphical icons 6, 7 are depicted in FIG. 2 close to the selected phone number 5 in addition to the page content of the contact page 1 as shown in FIG. 1.

The user is able to select the transmission of an SMS or the establishment of a call to the indicated number by tapping onto the corresponding icon 6, 7 with the stylus. In the described example, the user chooses to talk to the help desk. He/she thus taps onto the graphical icon representing the telephone receiver 7.

This selection is recognized as well by the new component of the operating system, which initiates thereupon the setup of a call.

FIG. 3 presents as third view on the display a call handling view 8. This view indicates that a connection to the selected number 9 is in course of being established.

Options are provided in this view for ending the call 10, for an audio control 11 and for selecting DTMF (Dual-Tone MultiFrequency) 12.

As becomes apparent from the described embodiment, the invention provides a communication enhancing feature for mobile phones. This feature is usable with all applications which may present alphanumeric information, but which provide conventionally no user interface for establishing a connection to another terminal or to some server.

The presented embodiment of the mobile phone and the method according to the invention constitutes only one of a variety of possible embodiments, and it can thus be varied in many ways.

That which is claimed:

1. A method comprising:
   processing content of an application displayed on a display of a mobile phone;
   determining from the processing of the content that part of the content is a first contact information and registering identification of the first contact information by the mobile phone, the first contact information being one of a phone number, fax number, or an email address;
   determining that two or more communication functions are associated with the first contact information, wherein each of the communication functions is of a different communication type;
   based on the determined communication functions, causing display of two or more icons, each of the icons representative of one of the determined communication functions; and
   responsive to receiving user selection of one of the two or more icons, registering the user selection in the mobile phone and activating a communication function of the corresponding communication type to and using the first contact information.

2. A method according to claim 1 wherein the establishment of the communication is setup of a telephone call, a fax transmission, transmission of an email, or transmission of a short message.

3. A mobile phone comprising:
   at least one processor and at least one memory including computer program code, the at least one memory and the computer program code configured to, with the processor, cause the mobile phone to at least:
   process content of an application displayed on a display;
   determine from the processing of the content that part of the content is a first contact information and register identification of the first contact information, the first contact information being one of a phone number, fax number, or an email address;
   determine that two or more communication functions are associated with the first contact information, wherein each of the communication functions is of a different communication type;
   based on the determined communication functions, cause two or more icons, each of the icons representative of one of the determined communication functions, to be displayed on the display; and
   responsive to receiving user selection of one of the two or more icons, register the user selection and activate a communication function of the corresponding communication type to and using the first contact information.

4. A mobile phone according to claim 3 wherein the establishment of the communication is setup of a telephone call, a fax transmission, transmission of an email, or transmission of a short message.

5. An apparatus comprising:
   at least one processor and at least one memory including computer program code, the at least one memory and the computer program code configured to, with the processor, cause the apparatus to at least:
   process content of an application displayed on a display;
   determine from the processing of the content that part of the content is a first contact information and register identification of the first contact information, the first contact information being one of a phone number, fax number, or an email address;
   determine that two or more communication functions are associated with the first contact information, wherein each of the communication functions is of a different communication type;
   based on the determined communication functions, cause two or more icons, each of the icons representative of one of the determined communication functions, to be displayed on the display; and
   responsive to receiving user selection of one of the two or more icons, register the user selection and activate a communication function of the corresponding communication type to and using the first contact information.

6. An apparatus according to claim 5 wherein the first contact information is a phone number, the two or more communication functions associated with the first contact information comprise a telephone function and a short message function, and the two or more icons comprise a first icon representative of the telephone function and a second icon representative of the short message function.

7. An apparatus according to claim 5 wherein the establishment of the communication is setup of a telephone call, a fax transmission, transmission of an email, or transmission of a short message.

8. A method according to claim 1, further comprising:
   before determining the part of the content is the first contact information, receiving input from a user selecting the part of the content.

9. A mobile phone according to claim 3, wherein the at least one memory and the computer program code are further configured to, with the processor, cause the mobile phone to:
   before determining the part of the content is the first contact information, receive input from a user selecting the part of the content.

10. An apparatus according to claim 5, wherein the at least one memory and the computer program code are further configured to, with the processor, cause the apparatus to:
   before determining the part of the content is the first contact information, receive input from a user selecting the part of the content.

11. A method according to claim 1, wherein the two or more communication functions are not associated with the application.

12. A method according to claim 1, further comprising:
   receiving input from a user selecting one of the icons; and
   establishing the communication using the first contact information and the communication function represented by the selected icon.

13. An apparatus according to claim 5, wherein the at least one memory and the computer program code are further configured to, with the processor, cause the apparatus to:
   receiving input from a user selecting one of the icons; and
   establishing the communication using the first contact information and the communication function represented by the selected icon.

14. A method according to claim 1, wherein the application is a browser, calendar application, phonebook application, or messaging application.

15. A mobile phone according to claim 3, wherein the application is a browser, calendar application, phonebook application, or messaging application.

16. An apparatus according to claim 5, wherein the application is a browser, calendar application, phonebook application, or messaging application.

17. A method according to claim 1, wherein the first contact information is a phone number, the two or more communication functions associated with the same phone number comprise a telephone function and a short message function, and the two or more icons comprise a first icon representative of the telephone function and a second icon representative of the short message function.

18. A mobile phone according to claim 3, wherein the first contact information is a phone number, the two or more communication functions associated with the same phone number comprise a telephone function and a short message function, and the two or more icons comprise a first icon representative of the telephone function and a second icon representative of the short message function.

* * * * *